United States Patent
Stojanovski et al.

(10) Patent No.: US 9,756,564 B2
(45) Date of Patent: Sep. 5, 2017

(54) SYSTEMS, METHODS, AND DEVICES FOR ENHANCED POWER SAVING FOR MOBILE TERMINATED COMMUNICATION

(71) Applicant: Intel IP Corporation, Santa Clara, CA (US)

(72) Inventors: Alexandre Stojanovski, Paris (FR); Puneet Jain, Hillsboro, OR (US); Richard Burbidge, Shrivenham (GB)

(73) Assignee: INTEL IP CORPORATION, Santa Clara, CA (US)

( * ) Notice: Subject to any disclaimer, the term of this patent is extended or adjusted under 35 U.S.C. 154(b) by 58 days.

(21) Appl. No.: 14/746,681

(22) Filed: Jun. 22, 2015

(65) Prior Publication Data

US 2016/0205625 A1    Jul. 14, 2016

Related U.S. Application Data (60) Provisional application No. 62/102,984, filed on Jan. 13, 2015, provisional application No. 62/127,994, filed on Mar. 4, 2015.

(51) Int. Cl.
*H04W 52/02* (2009.01)
*H04W 76/04* (2009.01)

(52) U.S. Cl.
CPC ... *H04W 52/0216* (2013.01); *H04W 52/0212* (2013.01); *H04W 52/0229* (2013.01); *H04W 76/046* (2013.01); *H04W 76/048* (2013.01); *Y02B 60/50* (2013.01)

(58) Field of Classification Search
CPC ......... H04W 52/0216; H04W 52/0212; H04W 52/0229; H04W 76/046; H04W 76/048
See application file for complete search history.

(56) References Cited

U.S. PATENT DOCUMENTS

| | | | |
|---|---|---|---|
| 8,817,303 B2* | 8/2014 | Fujii | 358/1.14 |
| 2004/0242199 A1* | 12/2004 | Edlund | H04W 8/245 |
| | | | 455/411 |
| 2007/0189220 A1* | 8/2007 | Oberle | H04L 29/06027 |
| | | | 370/331 |

(Continued)

FOREIGN PATENT DOCUMENTS

KR    1020140041305    4/2014

OTHER PUBLICATIONS

Intel, "Enhanced power saving mode for efficient MT communication", S2-150659, SA WG2 Meeting #107, Sorrento, Italy, Agenda Item 7.14, Jan. 26-31, 2015, 5 pages.

(Continued)

*Primary Examiner* — Mohammad Anwar
(74) *Attorney, Agent, or Firm* — Stoel Rives LLP (57) ABSTRACT

A user equipment (UE) is configured to send a request to use an enhanced power saving mode (ePSM) to a mobility management entity (MME) of a mobile communications network. The UE is configured to receive configuration parameters from the MME including a time length for an idle mode and a time length for a power saving mode. The UE is configured to cycle between the idle mode and the power saving mode based on the power saving mode parameters, wherein the UE is available to receive transmissions during the idle mode and unavailable to receive transmissions during the power saving mode.

20 Claims, 8 Drawing Sheets

(56) References Cited

U.S. PATENT DOCUMENTS

2013/0006435 A1\* 1/2013 Berrios .................. F24J 2/38
700/295
2015/0223198 A1\* 8/2015 Du .................... H04W 52/0203
455/458

OTHER PUBLICATIONS

Interdigital, "Interaction between PSM and existing functions", C1-141978, 3GPP TSG CT WG1 Meeting #87, Phoenix (AZ), USA, Agenda Item 12.4, May 19-23, 2014, 4 pages.
PCT/US2015/055443, International Search Report and Written Opinion, Jan. 25, 2016, 42 pages.

\* cited by examiner

SYSTEMS, METHODS, AND DEVICES FOR ENHANCED POWER SAVING FOR MOBILE TERMINATED COMMUNICATION

RELATED APPLICATION

This application claims the benefit under 35 U.S.C. §119(e) of U.S. Provisional Application No. 62/102,984, filed Jan. 13, 2015 and U.S. Provisional Application No. 62/127,994, filed Mar. 4, 2015, both of which are hereby incorporated by reference herein in their entirety.

TECHNICAL FIELD

The present disclosure relates to power saving on a mobile communication device and more particularly relates to an enhanced power saving mode for efficient mobile terminated communication.

DETAILED DESCRIPTION OF PREFERRED EMBODIMENTS

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, or eNodeBs) and Radio Network Controllers (RNCs) in an E-UTRAN, which communicates with the wireless mobile device, known as user equipment (UE). A downlink (DL) transmission can be a communication from the base station (or eNodeB) to the wireless mobile device (or UE), and an uplink (UL) transmission can be a communication from the wireless mobile device to the base station.

The present disclosure proposes systems methods and devices to improve power efficiency for mobile communication. Examples and embodiments herein include proposed changes to 3GPP standards to improve power efficiency for UE communication, such as machine type communication (MTC) devices or other devices, that require mobile terminated (MT) communication and which may also have some maximum delay delivery requirements. For example, some MT communications may have maximum delay requirements of an hour, a half hour, 15 minutes, 10 minutes, five minutes, or less. Some embodiments disclosed herein may be directed to the 3GPP Release 13 FS_HLComm in SA2 for Study on Optimizations to Support High Latency Communications.

According to one embodiment, a UEf is configured to send a request to use an enhanced power saving mode (ePSM) to a mobility management entity (MME) of a mobile communications network. The UE is configured to receive configuration parameters from the MME including a time length for an idle mode and a time length for a power saving mode and release a radio resource control (RRC) connection with the mobile communications network. The UE is configured to cycle between the idle mode and the power saving mode based on the power saving mode parameters, wherein the UE is available to receive transmissions during the idle mode and unavailable to receive transmissions during the power saving mode.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
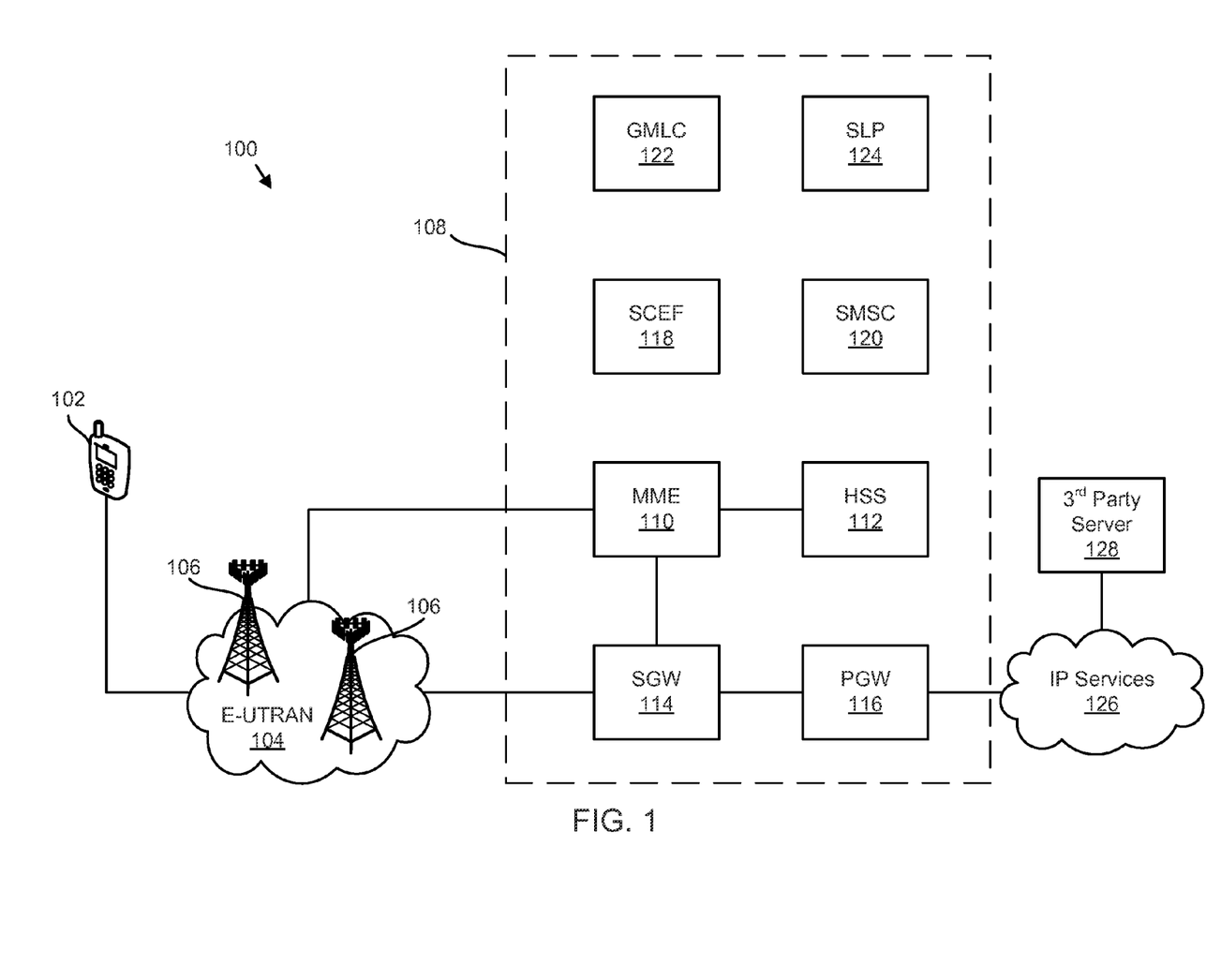
FIG. 1 is a schematic diagram illustrating a communication system for providing communication services to a wireless mobile device consistent with embodiments disclosed herein.

FIG. 1 illustrates an example communication system 100 for 3GPP access. The communication system 100 illustrates a variety of components that may be used to provide communication services or access to a UE 102. The communication system 100 includes an E-UTRAN 104, which includes a plurality of eNBs 106. The communication system 100 also includes a core network 108, for example, an evolved packet core (EPC) that includes an MME 110, a home subscriber server (HSS) 112, a serving gateway (SGW) 114, a packet data network (PDN) gateway (PGW) 116, a service capability enablement function (SCEF) 118, a short message service (SMS) center (SMSC) 120, a gateway mobile location center (GMLC) 122, and a secure user plane location (SUPL) location platform (SLP) 124. Example interfaces for communication between the various components are also indicated. The architecture and individual components are given by way of example only. One of skill in the art will recognize that aspects of the disclosure are applicable to communication systems with different architectures and/or that implement other standards.

The SGW 114 and PGW 116 provide access to an operator's internet protocol (IP) services 126, which may provide access to one or more third party servers 128, such as web servers or application servers. The SCEF 118, as will be discussed further herein, may provide one or more power saving mode parameters or enhanced power saving mode parameters to one or more other entities to allow for timed communication to the UE 102 or to allow knowledge of a current availability of the UE 102. The SMSC 120 is configured to store, forward, convert and/or deliver SMS messages. The SMSC 120 may include one or more of an SMS service center (SMS-SC), SMS gateway service center (SMS-GMSC), or other SMS infrastructure or system to interface with SMS infrastructure. The GMLC 122 is a control-plane system that may be used to determine or provide a location of a UE or other mobile station. The SLP 124 is a user-plane system that may be used to determine or provide a location of a UE or other mobile station.

Figure 2:
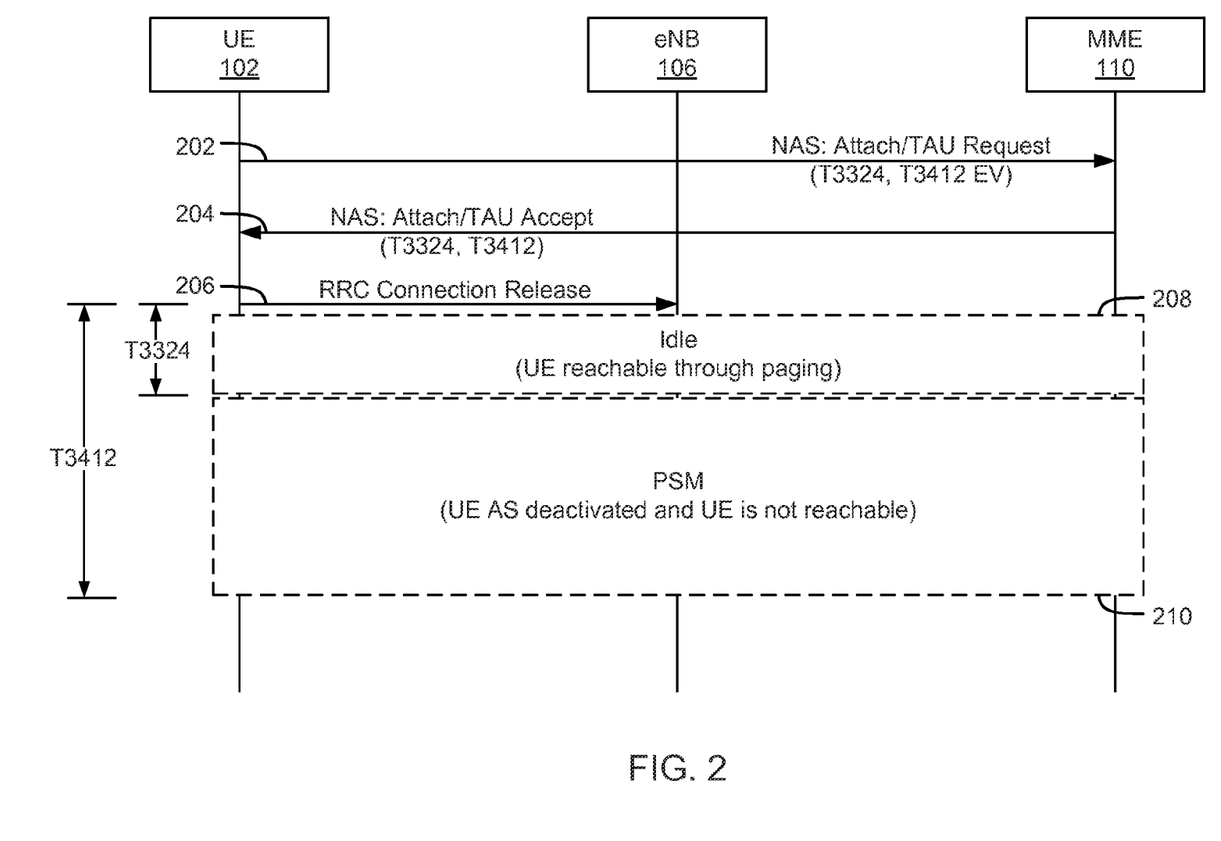
FIG. 2 is a schematic block diagram illustrating a call flow for a power saving mode.

In Release 12, 3GPP defined a new access stratum (AS) state referred to as power saving mode (PSM). FIG. 2 illustrates operation of the UE 102 in PSM. At 202, a UE 102 sends a non-access stratum (NAS) attach/tracking area update (TAU) request message that includes a value for T3324 timer and a T3412 extended value (EV). At 204, an MME 110 sends an NAS attach/TAU accept message, which may include a value for T3324 and T3412 to be used by the UE 102. At 206, the UE 102 releases an RRC connection with an eNB 106 or mobile network and enters an idle mode 208. During the idle mode 208, the UE 102 may remain reachable through paging. The duration of the sojourn time in the idle mode 208 is determined by the T3324 timer. Upon expiry of the T3324 timer, the UE 102 enters a PSM 210. The duration of the sojourn time in the PSM 210 is determined by the periodic TAU timer (T3412 in FIG. 2). When entering the PSM 210, the UE 102 turns off the AS completely and is not reachable for MT communications. Upon expiry of the periodic TAU timer T3412, the UE 102 performs the TAU signaling procedure (described in 3GPP technical specification (TS) 23.401 and TS 24.301) at which time it becomes reachable for MT communications again. If the UE 102 has no pending MT communication or has no need for Mobile Originated (MO) communication, the network puts the UE 102 in idle mode again and may configure it for a new PSM period (if the UE 102 has indicated in the TAU request message that it wishes to use power saving mode).

In Release 12, PSM was designed with primarily MO traffic in mind. While it is possible to support MT traffic, this is done in a very inefficient way. For instance, 3GPP TS 23.682 recommends the following for support of MT traffic:

A network side application may send an SMS or a device trigger to trigger an application on UE to initiate communication with the SCS/AS Alternatively, if an SCS/AS has periodic downlink data, it is more efficient when the UE initiates communication with the SCS/AS to poll for downlink data with that period For either of the options to work, the UE should request an Active Time that is long enough to allow for potential mobile terminated service or data delivery, e.g., to deliver an SMS The first item above suggests using SMS-based communication, at least as an initial trigger. SMS is a store-and-forward mechanism, and thus an SMS communication can be stored by an SMS-SC until the UE 102 becomes reachable. Once the stored MT SMS is delivered to the UE 102, the latter can initiate an MO communication with the server. One issue with this approach is the requirement for using SMS-based communication, which creates an unnecessary burden in a world of increasingly IP-based communications. Another issue with SMS is that the "Active Time" (which designates the duration of the idle mode sojourn time before the UE 102 enters PSM, e.g., T3324 in FIG. 2) needs to be long enough to allow the mobile network to indicate to the SMS-SC that the UE 102 is reachable and to allow for the delivery of the stored MT SMS to the UE 102.

The second item suggests transforming MT communication into MO communication using polling. While this might work well for periodic DL data, it is highly inefficient for use cases with non-periodic MT data, as most of the time the UE 102 would poll an application server for nothing.

In Release 12, 3GPP is starting new work called FS_HL-Com (3GPP TR 23.709 "Study on Optimizations for High Latency Communications"). One of the use cases under consideration is efficient support of non-scheduled (non-periodic) MT data for traffic that has some maximum delivery delay requirement, e.g., significantly lower than typical periodic TAU timer T3412 values. This use case cannot be addressed with PSM alone as defined in Release 12.

In TR 23.709, the solutions considered so far can be divided into two different solutions. In solution 2 in TR 23.709, long-term buffering in the SGW is proposed. In this solution, the SGW node becomes a new store-and-forward node in the evolved packet system (EPS) user plane (U-plane). That is, the SGW would store and forward in a manner similar to the SMS-SC in the EPS control-plane (C-plane). If an MT packet arrives at the SGW while the UE 102 is in PSM, the packet is stored until the UE 102 comes out of PSM. In another variant of the same proposal, the idle/PSM sojourn is replaced with an extended idle mode discontinuous reception (DRX) in which the DRX duration would be on the order of tens of minutes. Such DRX values are not supported in Release 12. One issue with long-term SGW buffering is that it can interact with end-to-end timers and retransmissions. Another issue is mobility handling (e.g., what happens with the stored packet if the UE 102, while in PSM, moves to another area that is served by another SGW?).

In solution 1 and solution 3 in TR 23.709, re-using monitoring (MONTE) solutions, that are also a work in progress, are disclosed. In this set of solutions a third party application server that wishes to send MT data needs to first subscribe for a "UE reachability" event with the EPS, either when it has pending MT data for sending or on a more long-term basis. The EPS then informs the application server whenever the UE 102 exits or enters PSM by using C-plane signaling. This solution introduces a lot of C-plane signaling, which can be undesirable.

Another issue, common to all PSM-based solutions, is the linkage between PSM and the timer that triggers periodic TAU (T3412). Specifically, it is impossible to tune T3412 and PSM separately. In order to be able to serve MT traffic appropriately, the periodic TAU timer would have to be configured to lower values to allow the UE 102 to come out of PSM more frequently. Unfortunately, the side effect of this would be highly increased power consumption because the exit from PSM requires the UE 102 to execute the TAU procedure. The frequent execution of the TAU procedure would also cause a lot of signaling load to the EPC.

In light of the above issues, Applicants disclose systems, methods and devices for efficient support of MT communications for traffic that has maximum delay delivery requirements. The efficiency comes in terms of improved power consumption for the UE 102 and low signaling volumes for the network. According to one embodiment, an ePSM may be defined such that, based on network configuration when there is no data communication for the UE 102, the UE 102 can alternate between successive idle mode and PSM intervals that are repeated periodically. In one embodiment, the period of the repetitive cycle is equal to the sum of a configured idle mode sojourn time (which may be referenced herein as Ti) plus a PSM sojourn time (which may be referenced herein as Tp). As a further enhancement, the repetitive pattern (Ti+Tp) may be deterministic and may be locked on an absolute clock reference (Tref). In other words, the combined (Ti+Tp) cycle may only start at instants defined as t=Tref+N*(Ti+Tp), where N is a whole number. In one embodiment, the parameters defining the periodic cycle (Tref, Ti, Tp) may be provided to a third party application server, or other entity, either by pre-configuration or by using the SCEF 118 to forward the information to the application server.

If the UE 102 needs to break the cycle for any reason (e.g., initiating MO communication, responding to paging, sending a periodic TAU, etc.), the UE 102 may return to the ePSM cycle (Ti+Tp) as soon as the network releases the RRC connection. Note that if the (Ti+Tp) cycle is locked to an absolute clock reference then this may involve a truncation or extension of the very first Ti or Tp interval, allowing the UE 102 to lock onto the absolute reference clock.

The devices, methods, and systems disclosed herein may have significant advantages. For example, in embodiments where the ePSM cycle (Ti+Tp) is locked to an absolute clock reference (Tref) and the cycle parameters (Tref, Ti, Tp) are provided to the SCEF 118 or application server, there may be no need for long-term buffering by the SGW 114 (the SGW 114 may still need to support short-term buffering while the UE 102 is paged, as required according to current 3GPP specification). Thus, the third party application server may always know when the UE 102 is in PSM, so it can refrain from sending MT data at those times. In other words the buffering may be moved from the SGW 114 to the data source (i.e., the application server).

As another example, contrary to Release 12, the duration of the PSM sojourn time (Tp) may not be linked to the periodic TAU timer (T3412). This may allow for configuring shorter PSM sojourn times (much shorter than typical T3412 values), which is beneficial for serving MT traffic within certain delay tolerance requirements. As another example, because the PSM sojourn time (Tp) may not be linked to the periodic TAU timer (T3412), the UE 102 may be able to freely alternate between idle mode and PSM without any signaling with the network. This can provide significant benefits of reducing the signaling load and improving the UE 102's power efficiency.

As another example, if the ePSM cycle (Ti+Tp) is deterministic (i.e., predictable by entities that know the cycle parameters) and is exposed to third party servers 128 (such as via an SCEF API) only a single time, there may be no need for communication with an application server every time the UE 102 changes between being reachable and not reachable. Of course, if the Ti and Tp values need to be changed for some reason, the new values could be updated to the application server (via SCEF API). However, in some embodiments, it is not expected that Ti and Tp will change frequently.

Figure 3:
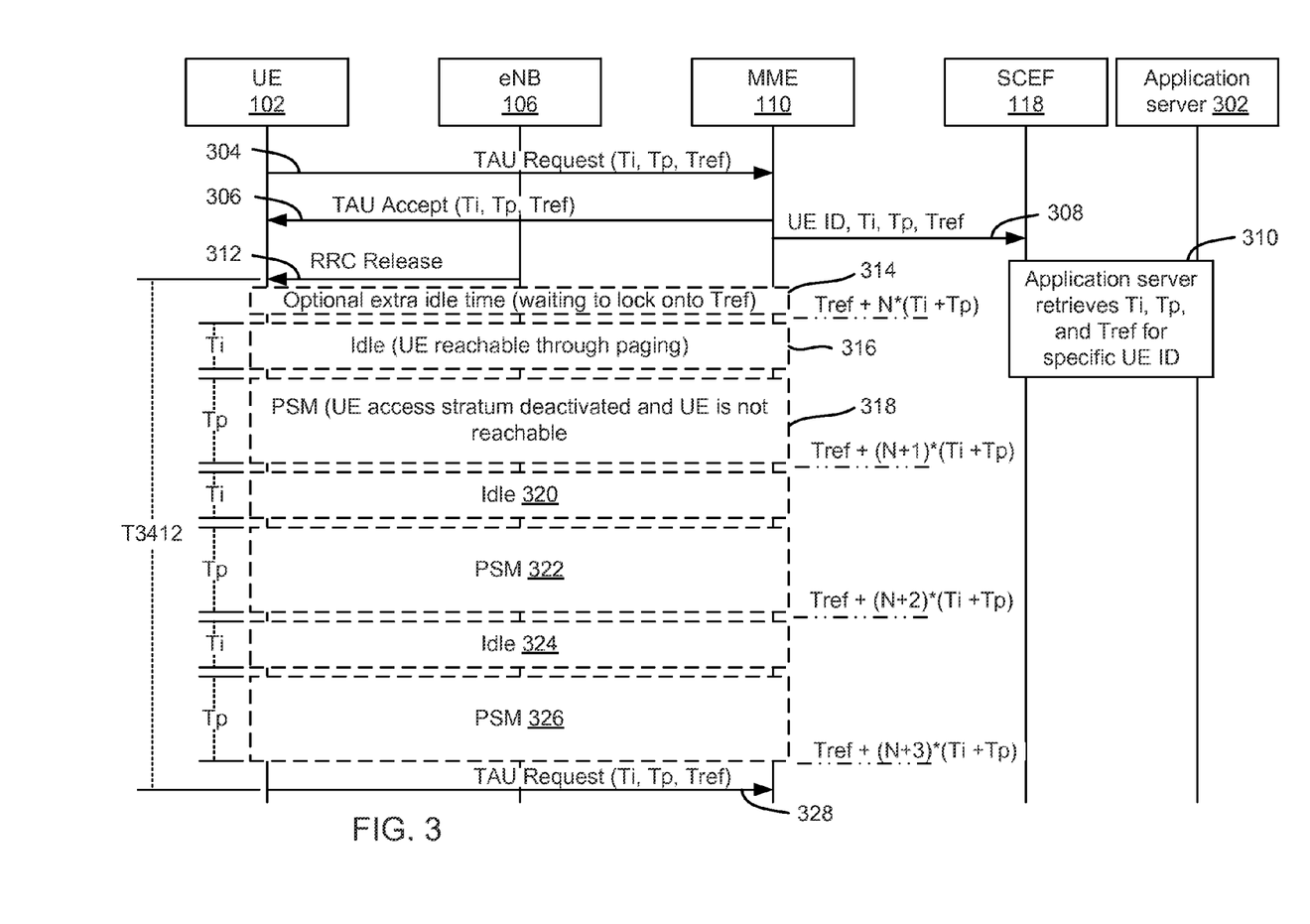
FIG. 3 is a schematic block diagram illustrating an example call flow for an enhanced power saving mode consistent with embodiments disclosed herein.

FIG. 3 illustrates one embodiment of a call flow for configuration of an ePSM in a UE 102. At 304, the UE 102 sends a TAU request message, for example, due to mobility or due to periodic TAU timer expiration. If the UE 102 wishes to use ePSM, it may include a set of parameters that describe the desired ePSM cycle. The parameters may include one or more of the duration of idle sojourn time (Ti), the duration of PSM sojourn time (Tp), and possibly an absolute clock reference (Tref). In one embodiment, the absolute clock reference (Tref) is based on a clock time that can be made available both within the UE 102 and outside the UE 102, such as at an application server 302. For example, universal coordinated time (UTC) or global positioning system (GPS) time may be used. In one embodiment, the UE 102 does not provide an absolute reference time (Tref), which may be beneficial to reduce the size of the attach/TAU request message. If the absolute reference time (Tref) is not set by the UE 102 then Tref may be selected by an MME 110, or other device or entity, instead.

The MME 110 may decide whether to allow ePSM based on an operator's configuration, or other requirements. If the MME 110 decides to accept the request, it sends, at 306, a TAU accept message including the approved description of the ePSM cycle (i.e., the original parameter values as proposed by the UE 102 in step 1, or modified values). Note that the MME 110 may modify the values describing the ePSM cycle if it does not accept the values as proposed by the UE 102. Alternatively, Tp and Ti timer values may be configured in an HSS 112 as part of the UE 102 subscription data, especially for machine-type communication (MTC) devices, and downloaded to the MME 110. If the MME 110 receives this information from the HSS 112 it may use it to override the values requested by the UE 102.

In one embodiment, the MME 110 may forward, at 308, the description of the ePSM cycle to an SCEF 118 along with a UE identifier (UE ID). At 310, the application server 302 retrieves Ti, Tp, and Tref for a specific UE ID, such as a UE ID to which the application server 302 wishes to send data. For example, a third party application server wishing to send MT data to the UE 102 registers with the SCEF 118 and obtains a description of the UE 102's ePSM cycle. Given that, in one embodiment, the ePSM cycle is described relative to an absolute time reference (Tref), the application server 302 needs to fetch the ePSM description from the SCEF 118 only once. The application server 302 may also subscribe to be notified in case the ePSM cycle parameters are modified or if the ePSM is cancelled for this UE 102. In one embodiment, steps 308 and 310 may be omitted.

At 312, an eNB 106 or the UE 102 releases the RRC connection. In response to the RRC connection release, the UE 102 may enter the ePSM cycle by going through an idle mode first. However, note that the RRC connection release message is asynchronous (i.e., it can occur at any instant), whereas the ePSM cycle, in this embodiment, is locked to an absolute time reference. Thus, RRC release at 312 may occur either within an idle interval or within a PSM interval of an ePSM cycle. In FIG. 3 it is assumed that RRC release occurred during the PSM interval. In this case, the UE 102 can use one of the following three options. In the first option, the UE 102 may lock immediately to the ePSM cycle by entering PSM immediately. In this case the very first PSM interval may be truncated.

In the second option, the UE 102 may decide to enter idle mode first and extend the idle mode until the start of the first upcoming PSM interval of the ePSM cycle. In this case the very first idle interval is longer than usual. This case is illustrated in FIG. 3 where the UE 102 enters an idle mode 314 upon release of the RRC connection. In the third option, the UE 102 enters the idle mode 314 first and remains in the idle mode 314 for a given time duration, possibly equal to the value of Ti, before reverting to the ePSM cycle. Stated otherwise, the UE 102 may be in an idle state for a short period before entering the PSM state, all before the first scheduled idle mode 314. Note that the second and third options may provide a desirable benefit in that they guarantee that the UE 102 is reachable for some time period immediately after the attach or TAU procedure, which is a time when there may be an increased possibility of MT signaling or data.

After entering an idle mode 316 based on an absolute reference time (Tref+N*(Ti+Tp)), the UE 102 cycles between a plurality of idle modes 316, 320, 324 and a plurality of PSMs 318, 322, 326. Each idle mode lasts for an idle mode duration Ti, and each PSM lasts for a PSM duration Tp. After the optional extra idle time at 314, the UE 102 may start each idle mode at an interval defined by Tref+(N+x)*(Ti+Tp), as indicated. After the T3412 timer expires, at 328, the UE 102 sends another TAU request. The TAU request may include new or revised parameter values for Ti, Tp, and/or Tref.

In one embodiment, the periodic TAU timer is independent of the ePSM cycle. Upon expiration of the periodic TAU timer (T3412), the UE 102 sends a periodic TAU request message, as usual. The UE 102 may use this opportunity to request a change of ePSM parameters or cancel the ePSM. The MME 110 may also contact the SCEF 118 to provide an updated ePSM description or indication that the UE 102 is not using ePSM anymore or is using modified parameters. The SCEF 118 notifies all application servers 302, or other entities, interested in the UE 102 about the change.

On the other hand, if the UE 102 is happy with the current ePSM configuration, the UE 102 may indicate this to the MME 110 by sending same parameter values as at 304. In one embodiment, the UE 102 may cancel ePSM by not including any ePSM-related parameters. Note that FIG. 3 provides an illustration of locking the cycle (Ti+Tp) to an absolute clock reference (Tref). In one embodiment, if the cycle is not locked to the absolute clock reference, the following changes would be made to the call flow of FIG. 3: first, forwarding the ePSM parameters at 308 and providing the parameters to the application server 302 would not occur; second, passing of the Tref parameter at 304 and 306 would not be needed; and third, the UE 102 would immediately enter the ePSM cycle (Ti+Tp) on release of the RRC connection at 312.

In one embodiment, the signaling of ePSM parameters (i.e., Ti, Tp, Tref) in FIG. 3 also applies to the attach procedure by replacing the TAU request/accept messages with the attach request/accept messages.

Figure 4:
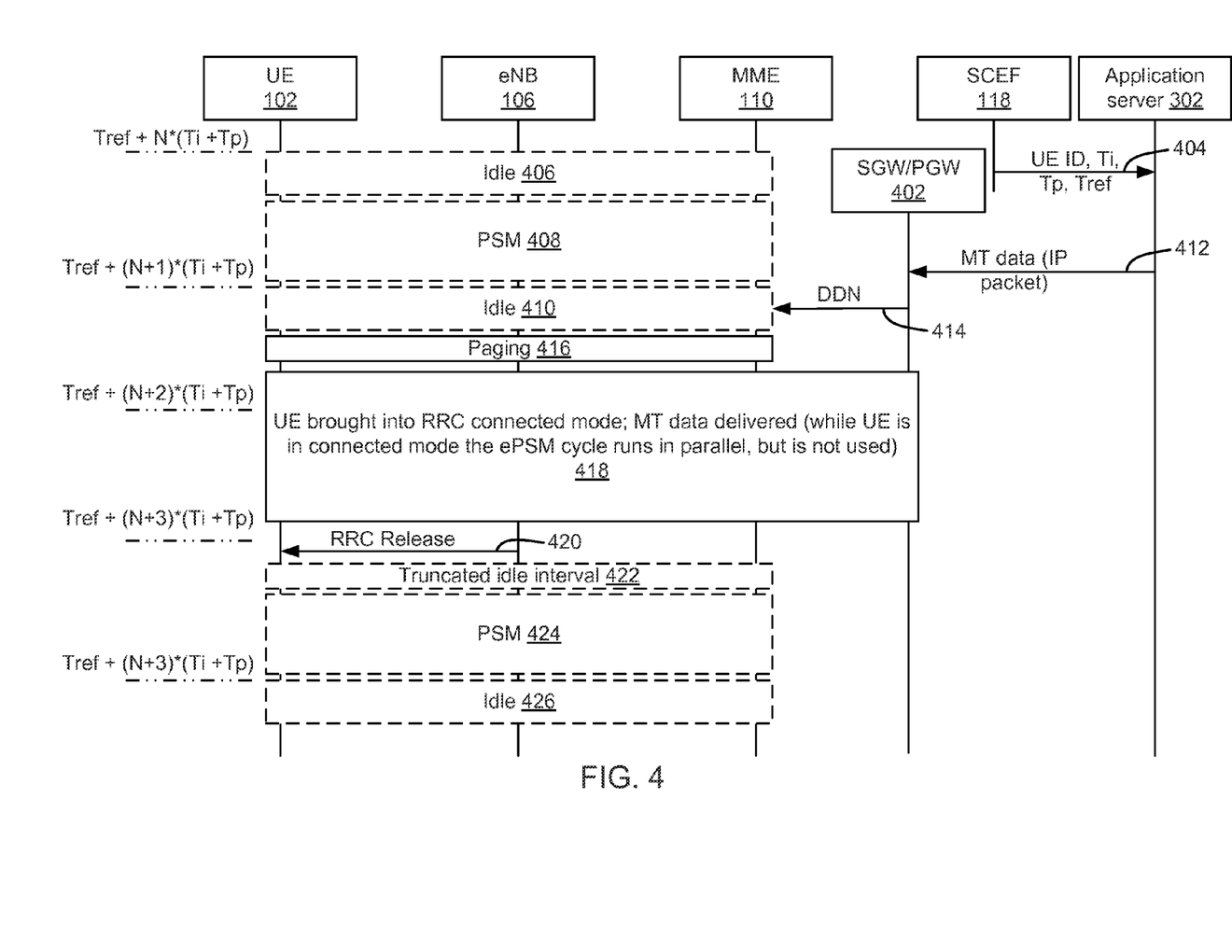
FIG. 4 is a schematic block diagram illustrating another example call flow for an enhanced power saving mode consistent with embodiments disclosed herein.

FIG. 4 illustrates one embodiment of a call flow for MT communication towards a UE 102 during ePSM. At the beginning of the call flow the UE 102 has entered the ePSM cycle and is alternating between the idle and PSM intervals. At 404, the application server 302 obtains the ePSM cycle description for this UE 102, including Ti, Tp, and Tref. When the application server 302 has MT data for sending, it waits until the UE 102 enters the idle interval before sending the MT packet(s). The UE 102 goes from an idle mode 406, to a PSM mode 408, and back to an idle mode 410. At 412, the application server 302 sends MT data, such as an internet protocol (IP) packet, an SGW/PGW 402 intended for the UE 102. The application server 302 sends the MT packet at a time when the UE 102 will be available to receive it (or at least be in an idle mode). The SGW stores the MT packets in a short-term buffer, and the SGW sends, at 414, a downlink data notification (DDN) message to 10 MME 110 to initiate paging. The MME 110 triggers paging at 416. Because the UE 102 is in an idle interval (the idle mode 410), the UE 102 is able to receive and process the paging message. At 418, the UE 102 and an eNB 106 establish a connection with the network and the UE 102 enters RRC connected mode. While in the connected mode, the ePSM cycle runs in parallel, but is not used in any way. The UE 102 just tracks the ePSM cycle in the background so that it can later lock on it again. During 418, the MT data may be received by the UE 102.

After the data communication is terminated, at some point the network may decide to release the RRC connection. The RRC connection is released at 420, which is within an idle interval. In the depicted embodiment, the UE 102 locks immediately on the PSM cycle at 424. As a result, the very first idle interval is a truncated idle interval 422 because there was not a full idle period before the PSM interval 424. Following the PSM interval 424 the UE 102 enters an idle mode 426 to continue the ePSM cycle.

Note that FIG. 4 illustrates the locking of the ePSM cycle onto an absolute clock reference (Tref) by beginning an idle mode at some multiple of the cycle length from Tref, by truncating an interval or by extending an interval. If no absolute clock or time reference were used, the following modifications may be made to the call flow: first, communication of ePSM configuration to the application server 302 at 404 may not occur; the application server 302 may send data when it is available, rather than timing it for an idle interval, as at 412 (i.e., the application server 302 would not have to wait for an idle interval, as the application server 302 would not be aware when an idle interval occurs for the UE 102); the SGW/PGW 402 may be required (and have the capability) to long term buffer the packet until it is possible for the UE 102 to be paged during one of its idle intervals; and the UE 102 may immediately enter the ePSM cycle upon release of the RRC connection, instead of at specific intervals offset from the absolute clock reference.

In some embodiments, it may be desirable to only receive text messages, such as SMS messages, at the UE 102 when the UE 102 is not in a power saving mode or other mode where the UE 102 is not available to receive incoming messages or transmissions. In one embodiment, MT SMS may be handled in the same way as with Release 12 PSM. For example, if the MT SMS arrives at the MME 110 while the UE 102 is in a PSM interval, the MME 110 indicates towards the SMS infrastructure that the UE 102 is unreachable and sets the UE 102 reachability request parameter (URRP) flag. The MT SMS may be delivered when the UE 102 is brought into connected mode again (e.g., due to periodic TAU timer expiry or due to MO data).

However, it is also possible to streamline the MT SMS delivery by exporting the ePSM cycle (i.e., Ti, Tp, Tref) towards the SMS infrastructure (such as an SMS-SC or SMS-GMSC). This way the SMS infrastructure will attempt MT SMS delivery only when it knows that the UE 102 is not in the PSM interval. Examples of procedures allowing for export of ePSM cycle towards the SMS infrastructure are discussed below.

For SMS-in-NAS option (i.e., where the MME 110 has an SGs interface with the MSC; refer to the main body of 3GPP TS 23.272) the ePSM cycle of the UE 102 can be exported to a messaging service center (MSC) by including it in the SGsAP-PAGING-REJECT message (see 3GPP TS 29.118 clause 8.13). The UE 102's ePSM cycle can further be exported from the MSC towards the SMS-SC by including it in the MAP-MT-FORWARD-SHORTMESSAGE response message (see 3GPP TS 29.002 clause 12.9).

For SMS-in-MME option (i.e., where the MME 110 has a direct SGd interface towards the SMS infrastructure; refer to 3GPP TS 23.272 Annex C) the UE 102's ePSM cycle can be exported towards the SMS service center by inclusion in the MT Forward Short Message answer message (3GPP TS 29.338 clause 6.2.2).

In one embodiment, information about an ePSM cycle may be forwarded to the PGW 116 or SGW 114. For example, the PGW 116 and (more seldom) the SGW 114 may trigger a network-originated control plane procedure such as dedicated bearer modification. If the UE 102 is in the PSM interval (unavailable) when the network-originated procedure is triggered, this may lead to timer expiry and retransmissions of general packet radio service (GPRS) tunneling protocol control (GTP-C) messages over the S5 and S11 interfaces. Note that this is a general issue with Release 12 PSM and may not apply to embodiments disclosed in the present application.

In one embodiment, the above issue can be addressed by exporting the ePSM cycle (i.e., Ti, Tp, Tref) towards the SGW 114 and PGW 116. For instance, when the UE 102 performs a TAU and requests use of ePSM, the MME 110 may export the ePSM cycle to an SCEF 118 (see FIG. 3 at 308). At the same time, or a different time, the MME 110 may export the ePSM cycle to the SGW 114 and PGW 116 using S11 and S5 GTP-C procedures (e.g., modify bearer request).

Figure 5:
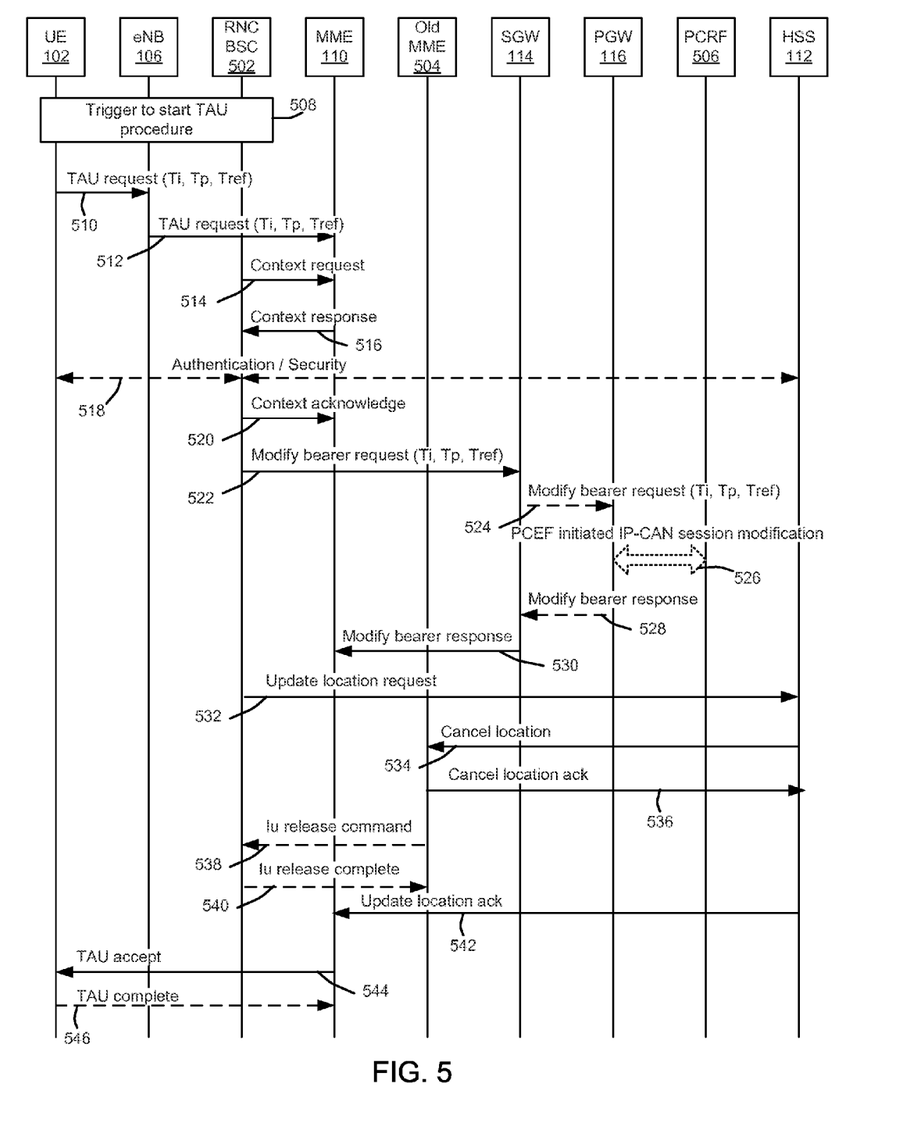
FIG. 5 is a schematic block diagram illustrating an example call flow for forwarding enhanced power saving mode parameters to a serving gateway or a packet data network gateway consistent with embodiments disclosed herein.

One embodiment of an overall procedure for exporting the ePSM cycle to the SGW 114 and PGW 116 is shown in FIG. 5. The embodiment of FIG. 5 may look like the procedure for TAU with the addition of the ePSM cycle parameters as depicted in FIG. 5 (based on 3GPP TS 23.401 FIG. 5.3.3.2-1). The call flow of FIG. 5 illustrates communication between a UE 102, an eNB 106, an RNC or BSC 502, an MME 110, an old or previous MME 504 for the UE 102, an SGW 114, a PGW 116, a poly charging and rules function (PCRF) 506, and an HSS 112. At 508, a TAU procedure is triggered, such as by expiration of a timer, the UE 102 mobility, or the like. At 510 the UE 102 sends a TAU request that includes Ti, Tp, and Tref to the eNB 106. The eNB 106 sends a TAU request, with Ti, Tp, and Tref, to the MME 110 at 512. At 514, the RNC or BSC 502 sends a context request to the MME 110 and the MME 110 sends, at 516, a context response. At 518, authentication or other security checks or procedures are performed. At 520, the RNC or BSC 502 sends a context acknowledgement to the MME 110. At 522, the RNC or BSC 502 sends a modify bearer request including Ti, Tp, and Tref to the SGW 114. The SGW 114 sends the bearer request, with Ti, Tp, and Tref, to the PGW 116 at 524. At 526, a PCEF initiated internet protocol-connectivity access network (IP-CAN) session modification is performed between the PGW 116 and the PCRF 506. At 528, the PGW 116 sends a modify bearer response to the SGW 114 and the SGW 114 sends the modify bearer response to the MME 110 at 530. At 532, the RNC or BSC 502 sends an update location request to the HSS 112. The HSS 112 sends a cancel location message to the old MME 504 at 534, and the old MME 504 sends a cancel location acknowledge to the HSS 112 at 536. The old MME 504 also sends an Iu release command to the RNC or BSC 502 at 538. The RNC or BSC 502 sends an Iu release complete to the old MME 504 at 540. The HSS 112 sends an update location acknowledge to the MME 110 at 542. The MME 110 sends a TAU accept to the UE 102 at 544, and the UE 102 responds with a TAU complete message at 546.

In one embodiment, it may be desirable to forward the ePSM configuration information to one or more location service entities. For example, if the location services infrastructure (such as a GMLC 122 or secure user plane location (SUPL) location platform (SLP)) initiates an MT location request while the UE 102 is in the PSM interval, the location request will fail. Note that this is a general issue with Release 12 PSM and is not specific to embodiments of the present application.

Figure 6:
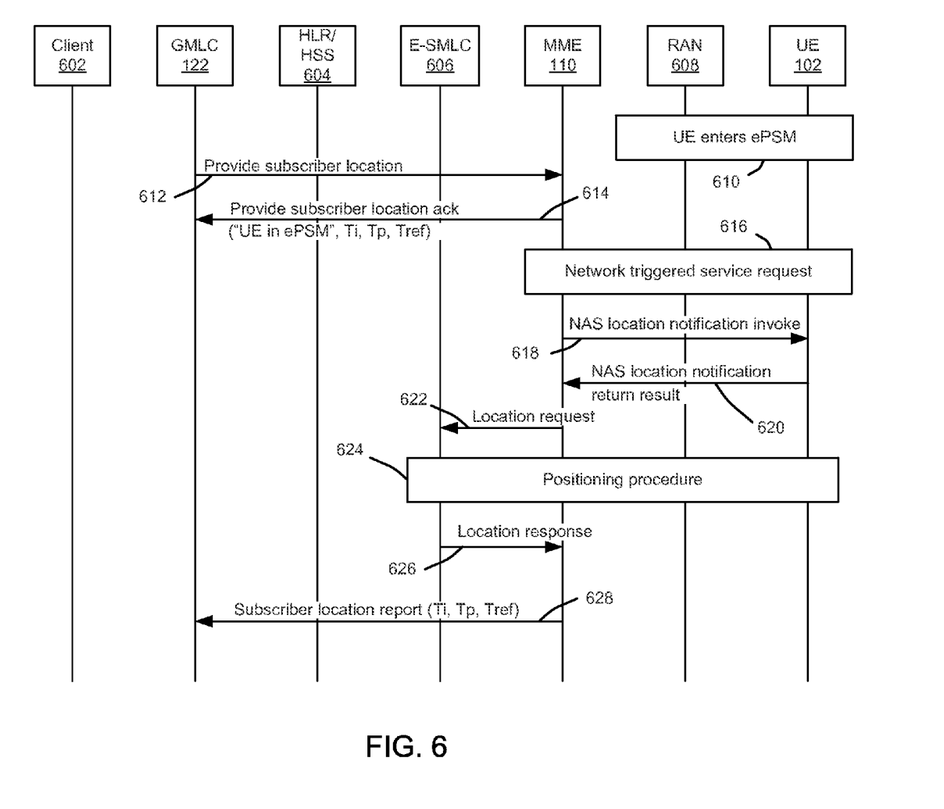
FIG. 6 is a schematic block diagram illustrating an example call flow for forwarding enhanced power saving mode parameters to a location center consistent with embodiments disclosed herein.

In one embodiment, the above issue can be addressed by exporting the ePSM cycle parameters (i.e., Ti, Tp, Tref) towards the GMLC 122 (or an SLP). This will keep the GMLC 122 from attempting MT location requests only when it knows that the UE 102 is not in the PSM interval. FIG. 6 illustrates one embodiment of general network positioning for evolved packet core MT location requests (EPC-MT-LR) based on 3GPP TS 23.271 FIG. 9.18. Specifically, FIG. 6 illustrates a call flow between a client 602, a GMLC 122, an HSS or home location register (HLR) 604, an enhanced service mobile location center (E-SMLC) 606, an MME 110, an RAN 608 (such as the E-UTRAN 104 of FIG. 1), and a UE 102.

At 610, the UE 102 enters ePSM (e.g., begins an ePSM cycle). At 612, the GMLC 122, which may not be informed that the UE 102 has entered ePSM, performs an MT location request by sending a provide subscriber location message. The MME 110 determines that the UE 102 is currently in a PSM interval and responds to the GMLC 122 at 614 by with a provide subscriber location acknowledge message, including an appropriate cause value ("UE in ePSM") and including the UE 102's ePSM cycle (Ti, Tp, Tref) so that the GMLC 122 can schedule future requests appropriately. At 616, the MME 110 triggers the UE 102 positioning procedure. For example, the MME may trigger the positioning procedure in response to determining that the UE 102 has entered the idle interval. During the positioning procedure, the MME 110 sends, at 618, an NAS location notification invoke and receives, from the UE 102, at 620, an NAS location notification return result. The MME 110 sends a location request to the E-SMLC 606 at 622. A positioning procedure occurs at 624, and the E-SMLC 606 sends a location response to the MME 110 at 626. At 628, the MME 110 sends a subscriber location report message to the GMLC 122 including the UE 102's current location and, optionally, including the UE 102's ePSM cycle parameters (Ti, Tp, Tref).

The above examples and embodiments may provide significant advantages and benefits over the existing PSM and TAU procedures and methods. For example, Release 12 PSM would not be able to meet shorter deadlines (e.g., 15 minutes) except by shortening the T3412 timer, which would cause high power and data usage because a TAU request and procedure would occur more frequently. In one embodiment disclosed herein, the TAU may be decoupled from the ePSM to allow for the UE 102 to enter and exit a PSM without affecting when the TAU procedures occur.

In embodiments that use the absolute clock reference (Tref), other entities can know when the UE 102 will be reachable or unreachable. For example, if Tref is based on UTC or GPS time, other devices can determine when the UE 102 is available and may only send MT communications when they can be received by the UE 102. This results in less control signaling, repeated sending, or other communication to reduce overall load on an EPC or mobile network. Furthermore, because other systems, devices, or entities know when the UE 102 is reachable, the idle or available times may be shorter, leading to a greater amount of time during which the UE 102 is in a very low power, but unreachable, mode. Also, the UE 102 can still respond to any requests within very short deadlines, if needed, while still having very low power utilization. As illustrated in FIG. 3, the UE 102 may be able to alternate between idle modes and PSMs without any TAU request. In one embodiment, the UE 102 may determine a current time during idle based on a broadcast message, such as a system information block (SIB) message. One embodiment of an SIB that may be used to help the UE 102 have an accurate clock is an SIB16 message.

In some embodiments, the Ti, Tp cycle may not be locked to an absolute clock reference or the absolute clock reference is not provided to other entities (e.g., beside the MME 110 and/or UE 102). In these embodiments, the Ti, Tp cycle may still provide significant benefits because the ePSM cycle is decoupled from the TAU procedures. If there is no Tref value, the SGW 114 may buffer for a longer period of time, such as 15 minutes or more (currently SGW in Release 12 only buffers for a couple of seconds). In one embodiment, the MME 110 tracks the Ti, Tp cycle for the UE 102 so that the UE 102 can be paged as soon as it becomes reachable. For example, the in absence of Tref the UE 102 may re-start the Ti, Tp cycle each time an RRC connection with the UE 102 is released. Similarly, the MME 110 may re-start the Ti, Tp cycle for the UE 102 each time the S1 release procedure with the eNB 106 is completed. The tracking of the Ti, Tp cycle at the MME 110 will not be perfect, but could be pretty close (e.g. 10 seconds for an idle mode would probably still be enough time to allow the MME 110 to accurately notify the UE 102 that it has incoming data).

Further example embodiments are also considered within the scope of this disclosure. In one embodiment, the MME 110 is configured to receive a request from the UE 102 indicating that the UE 102 wishes to use ePSM and to configure the UE 102 for using an ePSM cycle. In one embodiment, the ePSM cycle is defined as cyclic repetition of an idle interval and a PSM interval. In one embodiment, successive occurrences of the idle intervals determine time periods during which the UE 102 is reachable for MT communication. In one embodiment, successive occurrences of the PSM intervals determine time periods during which the UE 102 is not reachable for MT communication. In one embodiment, the MME 110 uses one or more of an NAS message or a TAU procedure to configure the UE 102 for using the ePSM cycle. In one embodiment, the MME 110 uses a TAU attach or NAS attach message to provide ePSM parameters or approve the UE 102 to enter an ePSM cycle.

In one embodiment, the ePSM cycle is locked on an absolute time reference (e.g., Tref). In one embodiment, the MME 110 forwards a description of the ePSM cycle to the SCEF 118. The description of the ePSM cycle may or may not include one or more of Ti, Tp, or Tref. In one embodiment, the MME 110 forwards a description of the SM cycle to SMS infrastructure, such as an SMC, SCMS-SC, or SMS-GMSC. In one embodiment, the MME 110 forwards a description of the ePSM cycle to the SGW 114 and/or the PGW 116. In one embodiment, the MME 110 forwards a description of the ePSM cycle to the GMLC 122 or SLP.

In one embodiment, the UE 102 is configured to send a request to the MME 110 indicating that it wishes to use an ePSM. The UE 102 is also configured to receive configuration parameters from the MME 110 for using an ePSM cycle and to start using the ePSM cycle. In one embodiment, the ePSM cycle is defined as cyclic repetition of an idle interval and a PSM interval. In one embodiment, successive occurrences of the idle intervals determine time periods during which the UE 102 is reachable for MT communication. In one embodiment, successive occurrences of the PSM intervals determine time periods during which the UE 102 is not reachable for MT communication. In one embodiment, the UE 102 is configured to use NAS messaging, such as a TAU procedure to obtain ePSM configuration from the MME 110. In one embodiment, the ePSM cycle is locked on an absolute time reference (e.g., Tref).

Figure 7:
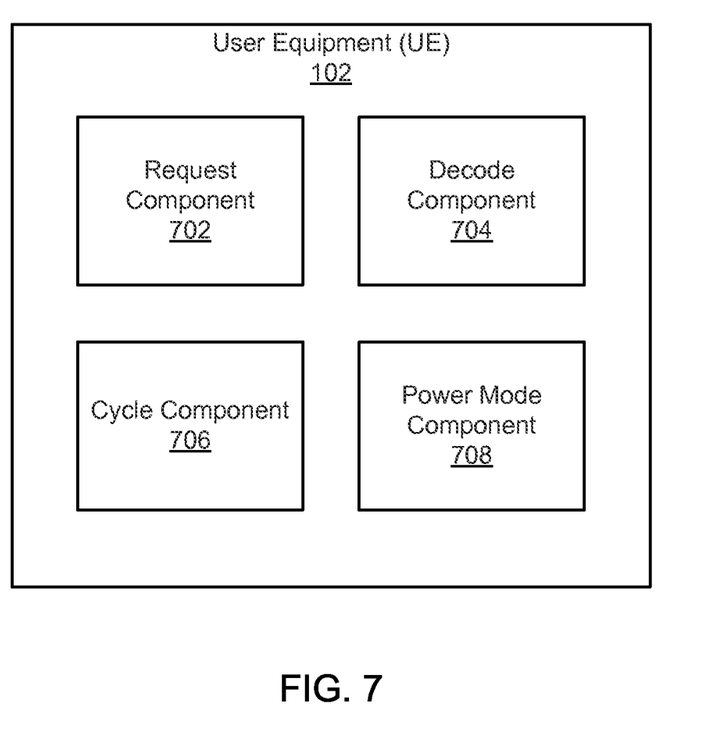
FIG. 7 is a schematic block diagram illustrating components of a user equipment (UE) consistent with embodiments disclosed herein.

Turning to FIG. 7, a schematic block diagram of one embodiment of a UE 102 is shown. The UE 102 includes a request component 702, a decode component 704, a cycle component 706, and a power mode component 708. In one embodiment, one or more of the components 702-708 are part of a processor, such as a baseband processor of the UE 102. For example, a baseband processor may be sold separately and included as part of the UE 102, such as a mobile phone or an MTC device. The UE 102 or processor may include logic, circuitry, code, or the like that implements each of the components 702-708.

The request component 702 is configured to format a request to enter a power saving mode to be sent to a mobile communications network. For example, the request may include one or more of the request 304 or 510 discussed above. The request component 702 may send, or cause the UE 102 to send, the request to use an ePSM to an MME 110 of a mobile communications network. In one embodiment, the request may include a TAU request or NAS message. In the case of a TAU request, the request component 702 may be configured to send the request in response to one or more of expiration of a TAU timer and mobility of the UE 102. In one embodiment, the request includes one or more of a recommended idle mode time (such as Ti), a recommended power saving mode time (such as Tp), or an absolute clock reference (Tref).

The decode component 704 is configured to decode a message from the mobile communications network indicating that the wireless communication device has permission to enter the power saving mode. In one embodiment, the decode component 704 is configured to decode a message from the MME 110 indicating acceptance of the UE 102 to use the ePSM. For example, the message may authorize the UE 102 to enter the ePSM cycle. In one embodiment, the decode component 704 is configured to receive configuration parameters from the MME 110 comprising a time length for an idle mode and a time length for a power saving mode (e.g., Ti and Tp). In one embodiment, the message from the MME 110 indicating acceptance to use the ePSM includes configuration parameters for the ePSM (e.g., Ti, Tp, and/or Tref). In one embodiment, the message from the mobile communications network includes the idle mode time and the power saving mode time. In one embodiment the recommended idle time and recommended power saving time from the UE 102 sent in a request is different than the idle time and the power saving time received from the mobile communications network.

The cycle component 706 is configured to determine parameters for the power saving mode, such as the ePSM, comprising an idle mode time and a power saving mode time. In one embodiment, the cycle component 706 is further configured to determine configuration parameters further including an absolute time reference (such as Tref). In one embodiment, the absolute time reference includes a universal time reference based on a generally known time standard, such as a UTC time reference and/or a GPS time reference. In one embodiment, the cycle component 706 is configured to determine a current universal time corresponding to the universal time reference based on a message received during an idle mode. For example, the cycle component 706 may determine what the current time is based on the received message. In one embodiment, the message received during an idle mode comprises an SIB16 message.

The power mode component 708 is configured to cycle between the idle mode and the PSM based on the power saving mode parameters. In one embodiment, the power mode component 708 powers down or powers up portions of a chip or the UE 102 to place the UE 102 in the idle mode or the PSM. In one embodiment, the UE 102 is available to receive transmissions during the idle mode and unavailable to receive transmissions during the PSM. In one embodiment, the power mode component 708 may begin cycling between the idle and PSM mode upon release of an RRC connected mode or RRC connection with the mobile communications network and/or and in response to decoding a message from the MME 110 (or other entity of a mobile communications network) indicating acceptance for the UE 102 to use the ePSM. In one embodiment, the power mode component 708 is configured to begin cycling between the idle mode and the power saving mode based on the absolute time reference. For example, the power mode component 708 may align the idle mode or the PSM with Tref. In one embodiment, the power mode component 708 is further configured to truncate or extend one of an initial idle mode time period and an initial power saving mode time period to align cycling between the idle mode and the power saving mode with the absolute time reference.

Figure 8:
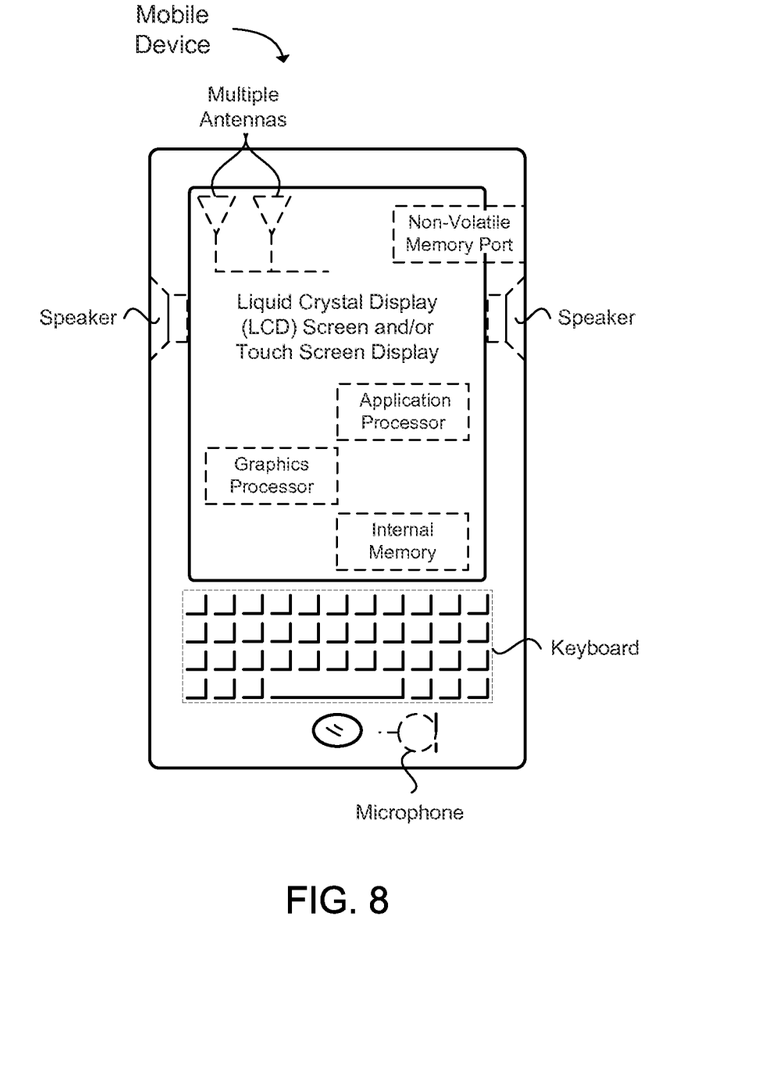
FIG. 8 is a schematic diagram of a mobile device consistent with embodiments disclosed herein.

FIG. 8 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Examples

The following examples pertain to further embodiments.

Example 1 is a UE that is configured to send a request to use an ePSM to a MME of a mobile communications network. The UE is configured to receive configuration parameters from the MME comprising a time length for an idle mode and a time length for a power saving mode. The UE is configured to cycle between the idle mode and the power saving mode based on the power saving mode parameters, wherein the UE is available to receive transmissions during the idle mode and unavailable to receive transmissions during the power saving mode.

In Example 2, the request of Example 1 includes one or more of: a TAU request, wherein the UE is configured to send the request in response to one or more of expiration of a TAU timer and mobility of the UE; and an attach request.

In Example 3, the configuration parameters of any of Examples 1-2 further include an absolute time reference and the UE is configured to begin cycling between the idle mode and the power saving mode based on the absolute time reference.

In Example 4, the UE of Example 3 is further configured to truncate or extend one of an initial idle mode time period and an initial power saving mode time period to align cycling between the idle mode and the power saving mode with the absolute time reference In Example 5, the UE of any of Examples 1-4 is further configured to decode a message from the MME indicating acceptance of the UE to use the ePSM.

In Example 6, the message from the MME indicating acceptance in Example 5 includes the configuration parameters for the ePSM.

Example 7, is a computer readable storage media storing executable instructions that, when executed by a processor of a computer system, cause the computer system to: process a request from a UE to use an ePSM; determine configuration parameters for use by the UE in the ePSM, wherein the configuration parameters include a time length for an idle mode and a time length for a power saving mode; and format a message indicating acceptance for the UE to use the ePSM.

In Example 8, the ePSM of Example 7 includes a cyclic repetition between the idle mode and the power saving mode, wherein the UE is available for MT communication in the idle mode and wherein the UE is unavailable for MT communication in the power saving mode.

In Example 9, the executable instructions of any of Examples 7-8 cause the computer system to process a request comprising a TAU request or attach request and format the message indicating acceptance comprising a TAU accept message or an attach accept message.

In Example 10, the configuration parameters of any of Examples 7-9 further include a time reference based on a generally known time standard.

In Example 11, the executable instructions of any of Examples 7-10 further cause the computer system to forward at least one of the configuration parameters to one or more of a SCEF, a SGW, a PGW, a GMLC, and a SMS infrastructure.

In Example 12, the executable instructions of any of Examples 7-11 cause the computer system to determine the configurations parameters by receiving the configuration parameters from a HSS for the UE.

Example 13 is a processor, such as a baseband processor, including logic. The logic includes a request component configured to format a request to enter a power saving mode to be sent to a mobile communications network. The logic includes a decode component configured to decode a message from the mobile communications network indicating that the wireless communication device has permission to enter the power saving mode. The logic includes a cycle component configured to determine parameters for the power saving mode comprising an idle time and a power saving mode time. The logic includes a power mode component configured to cycle between an idle mode and a power saving mode based on the power saving mode parameters.

In Example 14, the request in Example 13 includes a recommended idle time and a recommended power saving mode time.

In Example 15, the message in Example 14 from the mobile communications network comprises the idle time and the power saving mode time, wherein the recommended idle time is different than the idle time and the recommended power saving time is different than the power saving time.

In Example 16, the cycle component in any of Examples 13-15 is further configured to determine parameters comprising an absolute time reference based on a generally known time standard.

In Example 17, the absolute time reference in Example 16 includes one or more of a UTC reference and a GPS time reference.

In Example 18, the processor of any of Examples 16-17 is configured to determine a current time corresponding to the absolute time reference based on a message received during an idle mode.

In Example 19, the message received during an idle mode in Example 18 includes a SIB16 message.

In Example 20, the processor of any of Examples 13-19 is available to receive or process messages during the idle mode and the processor is unavailable to receive or process messages during the power saving mode.

Example 21 is a method that includes sending, from a UE, a request to use an ePSM to a MME of a mobile communications network. The method includes receiving, at the UE, configuration parameters from the MME including a time length for an idle mode and a time length for a power saving mode. The method includes cycling the UE between the idle mode and the power saving mode based on the power saving mode parameters, wherein the UE is available to receive transmissions during the idle mode and unavailable to receive transmissions during the power saving mode.

In Example 22, the request in Example 21 includes one or more of: a TAU request, wherein sending the request comprises sending in response to one or more of expiration of a TAU timer and mobility of the UE; and an attach request.

In Example 23, the configuration parameters in any of Examples 21-22 further include an absolute time reference and wherein the method includes beginning cycling between the idle mode and the power saving mode based on the absolute time reference.

In Example 24, the method of Example 23 further includes truncating or extending one of an initial idle mode time period and an initial power saving mode time period to align cycling between the idle mode and the power saving mode with the absolute time reference.

In Example 25, the method of any of Examples 21-24 further includes decoding a message from the MME indicating acceptance of the UE to use the ePSM.

In Example 26, the message from the MME indicating acceptance in Example 25 includes the configuration parameters for the ePSM.

Example 27 is a computer implemented method for power savings. The method includes processing a request from a UE to use an ePSM. The method includes determining configuration parameters for use by the UE in the ePSM, wherein the configuration parameters include a time length for an idle mode and a time length for a power saving mode. The method includes formatting a message indicating acceptance for the UE to use the ePSM.

Example 28 is the computer implemented method of Example 27 wherein one or more of: the ePSM includes a cyclic repetition between the idle mode and the power saving mode, wherein the UE is available for MT communication in the idle mode and wherein the UE is unavailable for MT communication in the power saving mode; the request comprises a tracking area update (TAU) request or attach request and the message indicating acceptance comprises a TAU accept message or an attach accept message; and the configuration parameters further comprise a time reference based on a generally known time standard.

In Example 29, the executable instructions in any of Examples 27-28 further cause the computer system to forward at least one of the configuration parameters to one or more of a SCEF, a SGW, a PGW, a GMLC, and a SMS infrastructure.

In Example 30, the executable instructions in any of Examples 27-29 cause the computer system to determine the configurations parameters based on configuration parameters received from a HSS for the UE.

Example 31 is a method that includes formatting a request to enter a power saving mode to be sent from a wireless communication device to a mobile communications network. The method includes decoding a message from the mobile communications network indicating that the wireless communication device has permission to enter the power saving mode. The method includes determining parameters for the power saving mode comprising an idle time and a power saving mode time. The method includes cycling the wireless communication device between an idle mode and a power saving mode based on the power saving mode parameters.

Example 32 is an apparatus including means to perform a method as disclosed or performed in any of Examples 13-31.

Example 33 is at least one computer-readable storage medium having stored thereon computer-readable instructions, when executed, to implement a method or realize an apparatus as in any of Examples 13-32.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) configured to:
send a request to use an enhanced power saving mode (ePSM) to a mobility management entity (MME) of a mobile communications network;
receive configuration parameters from the MME comprising a time length for an idle mode and a time length for a power saving mode; and
cycle between the idle mode and the power saving mode during the ePSM based on the configuration parameters, wherein:
the UE is available to receive transmissions during the idle mode and unavailable to receive transmissions during the power saving mode; and
the UE transitions directly from the idle mode to the power saving mode, and directly from the power saving mode to the idle mode in a cyclic manner during the ePSM.

2. The UE of claim 1, wherein the request comprises one or more of:
a tracking area update (TAU) request, wherein the UE is configured to send the request in response to one or more of expiration of a TAU timer and mobility of the UE; and
an attach request.

3. The UE of claim 1, wherein the configuration parameters further comprise an absolute time reference and wherein the UE is configured to begin cycling between the idle mode and the power saving mode based on the absolute time reference.

4. The UE of claim 3, wherein the UE is further configured to truncate or extend one of an initial idle mode time period and an initial power saving mode time period to align cycling between the idle mode and the power saving mode with the absolute time reference.

5. The UE of claim 1, wherein the UE is further configured to decode a message from the MME indicating acceptance of the UE to use the ePSM.

6. The UE of claim 5, wherein the message from the MME indicating acceptance comprises the configuration parameters for the ePSM.

7. A non-transitory computer readable storage media storing executable instructions that, when executed by a processor of a computer system, cause the computer system to:
process a request from a user equipment (UE) to use an enhanced power saving mode (ePSM);
determine configuration parameters for use by the UE in the ePSM, wherein the configuration parameters comprise a time length for an idle mode and a time length for a power saving mode for transitioning directly from the idle mode to the power saving mode, and directly from the power saving mode of the idle mode in a cyclic manner during the ePSM; and
format a message indicating acceptance for the UE to use the ePSM as set forth in the configuration parameters.

8. The non-transitory computer readable storage media of claim 7, wherein ePSM comprises a cyclic repetition between the idle mode and the power saving mode, wherein the UE is available for mobile terminated (MT) communication in the idle mode and wherein the UE is unavailable for MT communication in the power saving mode.

9. The non-transitory computer readable storage media of claim 7, wherein the executable instructions cause the computer system to process a request comprising a tracking area update (TAU) request or attach request and format the message indicating acceptance comprising a TAU accept message or an attach accept message.

10. The non-transitory computer readable storage media of claim 7, wherein configuration parameters further comprise a time reference based on a generally known time standard.

11. The non-transitory computer readable storage media of claim 7, wherein the executable instructions further cause the computer system to forward at least one of the configuration parameters to one or more of:
- a service capability exposure function (SCEF);
- a serving gateway (SGW);
- a packet data network (PDN) gateway (PGW);
- a gateway mobile location center (GMLC); and
- a short message service (SMS) infrastructure.

12. The non-transitory computer readable storage media of claim 7, wherein the executable instructions cause the computer system to determine the configurations parameters by receiving the configuration parameters from a home subscriber service (HSS) for the UE.

13. A processor comprising logic, the logic comprising:
- a request component configured to format a request to enter an enhanced power saving mode to be sent to a mobile communications network;
- a decode component configured to decode a message from the mobile communications network indicating that the wireless communication device has permission to enter the enhanced power saving mode;
- a cycle component configured to determine parameters for the power saving mode comprising an idle time and a power saving mode time; and
- a power mode component configured to cycle between an idle mode and a power saving mode based on the parameters for the power saving mode, wherein the power mode component transitions directly from the idle mode to the power saving mode, and directly from the power saving mode to the idle mode in a cyclic manner during the enhanced power saving mode.

14. The processor of claim 13, wherein the request includes a recommended idle time and a recommended power saving mode time.

15. The processor of claim 14, wherein the message from the mobile communications network comprises the idle time and the power saving mode time, wherein the recommended idle time is different than the idle time and the recommended power saving time is different than the power saving time.

16. The processor of claim 13, wherein the cycle component is further configured to determine parameters comprising an absolute time reference based on a generally known time standard.

17. The processor of claim 16, wherein the absolute time reference comprises one or more of a coordinated universal time (UTC) reference and a global positioning system (GPS) time reference.

18. The processor of claim 16, wherein the processor is configured to determine a current time corresponding to the absolute time reference based on a message received during an idle mode.

19. The processor of claim 18, wherein the message received during an idle mode comprises a system information block (SIB) 16 (SIB16) message.

20. The processor of claim 13, wherein the processor is available to receive or process messages during the idle mode and wherein the processor is unavailable to receive or process messages during the power saving mode.

* * * * *